(12) United States Patent
Patterson et al.

(10) Patent No.: US 6,438,477 B1
(45) Date of Patent: Aug. 20, 2002

(54) VEHICLE SEAT OCCUPANT CHARACTERIZATION METHOD INCLUDING EMPTY SEAT DETECTION

(75) Inventors: James F. Patterson, Greentown; Chance L Scales, Kokomo; Royce L. Rennaker, Converse; Charles A. Gray, Noblesville, all of IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/083,730

(22) Filed: Feb. 27, 2002

(51) Int. Cl.7 .............................................. G06F 17/00
(52) U.S. Cl. ........................ 701/45; 280/735; 280/801.1
(58) Field of Search .................................. 280/734, 735, 280/801.1; 701/35, 45, 46, 47; 180/271, 282, 268, 273; 177/209; 297/DIG. 3, 452.41, 195.12, 284.16; 340/436, 666, 665, 667

(56) References Cited

U.S. PATENT DOCUMENTS

| | | | |
|---|---|---|---|
| 5,987,370 A | | 11/1999 | Murphy et al. ............... 701/45 |
| 6,089,106 A | * | 7/2000 | Patel et al. ................. 280/735 |
| 6,101,436 A | * | 8/2000 | Fortune et al. ............. 280/735 |
| 6,161,070 A | * | 12/2000 | Finno et al. .................. 701/45 |
| 6,246,936 B1 | | 6/2001 | Murphy et al. ............... 701/45 |

FOREIGN PATENT DOCUMENTS

JP    49706   * 6/1992 ................... 701/45

* cited by examiner

Primary Examiner—Richard M. Camby
(74) Attorney, Agent, or Firm—Jimmy L. Funke

(57) ABSTRACT

An improved weight-based occupant characterization method distinguishes between an empty seat and a seat having a small object on it using primary and secondary classification techniques. The primary classification technique is initiated prior to vehicle movement, and characterizes the seat occupant based on measured seat pressure. If deployment of the restraint is suppressed due to the characterization of the primary classification technique, the seat occupancy is characterized by a secondary classification technique based on variation of the measured pressure once the vehicle is in motion. Once the secondary classification technique has characterized the seat occupancy, the characterization of the primary classification technique is discarded in favor of the characterization of the secondary classification technique.

4 Claims, 3 Drawing Sheets

VEHICLE SEAT OCCUPANT CHARACTERIZATION METHOD INCLUDING EMPTY SEAT DETECTION

TECHNICAL FIELD

This invention relates to a method of characterizing the occupant of a motor vehicle seat for purposes of allowing or suppressing air bag deployment based on sensed occupant weight, and more particularly to a method of distinguishing an empty seat from a seat having an object placed on it.

BACKGROUND OF THE INVENTION

Vehicle occupant weight detection systems are useful in connection with air bags and other pyrotechnically deployed restraints as a means of characterizing the occupant for purposes of determining whether to allow or suppress deployment of the restraints. For example, it is generally desired to allow deployment for a child or small adult, and to suppress deployment (or reduce deployment force) for a small child. In the case of infant or child seats (referred to herein collectively as child seats) that are placed on the vehicle seat and cinched down with a seat belt, it is generally believed that deployment should be suppressed entirely.

As disclosed in U.S. Pat. No. 6,247,936 issued on Jun. 12, 2001 and assigned to the assignee of the present invention, a tightly cinched child seat can be distinguished from a small adult (such as a $5^{th}$ percentile adult female) by detecting the variation in the sensed weight during vehicle movement. The occupant is characterized as a child or small adult if the variation exceeds a threshold, whereas the occupant is characterized as a child seat if the variation is below the threshold, as a tightly cinched seat belt severely restricts variance. And as disclosed in U.S. patent application Ser. No. 09/895,742 filed on Jul. 20, 2001, and assigned to the assigned to the assignee of the present invention, detected pressure variations due to operating the vehicle on a rough road surface are minimized by normalizing the detected pressure variation for fluctuations in vertical acceleration of the vehicle during vehicle movement.

An issue that is not addressed in the above-mentioned patent applications, however, concerns distinguishing between an empty seat and a seat having a small object placed on it. Although the detected pressure may initially resemble an empty seat due to the low indicated weight, variation of the detected pressure during the ensuing vehicle operation can lead the system to conclude that the seat is occupied by a small unrestrained child. In a worst case condition, the system can oscillate between the two characterizations. Although deployment of the inflatable restraints will be suppressed in either event (empty seat or small child), it is important to know when the seat is truly empty for purposes of adaptive calibration. Additionally, in applications where the occupant characterization and suppression status are displayed for driver verification of proper system operation, it is confusing for the displayed status to repeatedly shift between messages indicating empty seat and child occupant. Accordingly, what is needed is a method of more accurately distinguishing between an empty seat and a seat having a small object on it, and for displaying a consistent status message to the driver of the vehicle.

SUMMARY OF THE INVENTION

The present invention is directed to an improved weight-based occupant characterization method that reliably distinguishes between an empty seat and a seat having a small object on it. According to the invention, the seat occupancy is characterized using primary and secondary classification methodologies depending on the vehicle operation. The primary classification methodology is initiated prior to vehicle movement, and characterizes the seat occupant based on measured seat pressure. If deployment of the restraint is suppressed due to the characterization of the primary classification methodology, the seat occupancy is characterized by a secondary classification methodology based on variation of the measured pressure once the vehicle is in motion. Once the secondary classification methodology has characterized the seat occupancy, the characterization of the primary classification methodology is discarded in favor of the characterization of the secondary classification methodology.

DESCRIPTION OF THE PREFERRED EMBODIMENT

The present invention is disclosed in the context of a restraint system for an occupant of a vehicle passenger seat 10, where the occupant weight is detected based on the fluid pressure in a seat cushion bladder 12. In general, however, the present invention applies to other types of weight-based occupant detection systems as well, such as systems that sense the strain in a seat frame element, or systems that include a network of pressure sensitive cells distributed over the seating area.

Figure 1:
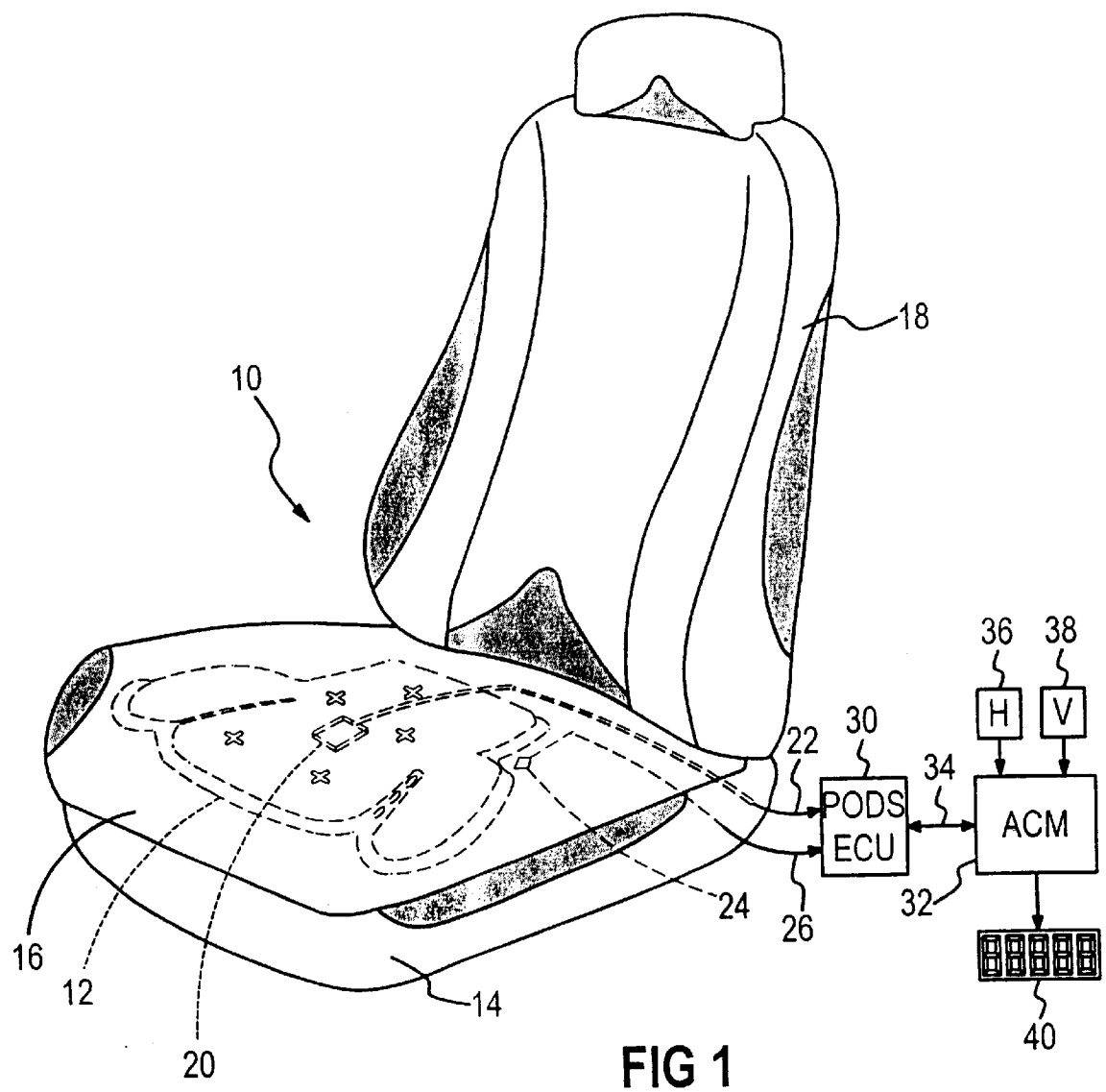
FIG. 1 is a system diagram illustrating a passenger seat of a vehicle equipped with a fluid-filled bladder, a passenger occupant detection electronic control unit (PODS ECU) and an airbag control module (ACM) according to this invention.

Referring to FIG. 1 the vehicle seat 10 is supported on a frame 14, and includes foam cushions 16 and 18 on the seat bottom and back. The bladder 12 is disposed in or under the foam cushion 16 substantially parallel with the central seating surface, and preferably contains a fluid such as silicone which is non-corrosive, and not subject to freezing at extreme ambient temperatures. In addition, a rigid backplate may be placed under the bladder 12 to provide a suitable reaction surface, as disclosed for example in the U.S. patent application Ser. No. 09/311,576, filed on.

The bladder 12 is coupled to a pressure sensor 20, which provides an electrical output signal on line 22 indicative of the fluid pressure in the bladder 12. A temperature sensor 24 located in proximity to the bladder 12 provides an electrical output signal on line 26 indicative of the bladder and foam temperature. The sensor 24 can be provided as a separate sensor as indicated in FIG. 1, or may be integrated with the pressure sensor 20.

The electrical pressure and temperature signals on lines 22 and 26 are provided as inputs to a passenger occupant detection system electronic control unit (PODS ECU) 30, which in turn, is coupled to an airbag control module (ACM) 32 via bi-directional communication bus 34. The ACM 32 may be conventional in nature, and operates to deploy one or more airbags or other restraint devices (not shown) for vehicle occupant protection based on the vertical and/or horizontal acceleration signals obtained from vertical acceleration sensor (V) 38 and horizontal acceleration sensor (H) 36, and occupant characterization data obtained from PODS ECU 30. In general, ACM 32 deploys the restraints if the acceleration signals indicate the occurrence of a severe crash, unless the PODS ECU 30 indicates that deployment should be suppressed. Of course, other more sophisticated controls are also possible, such as controlling the deployment force of the restraint devices based on the occupant characterization data provided by PODS ECU 30. Also, ACM 32 communicates the suppression status to a driver display device 40 to enable the driver to verify proper system operation.

In the illustrated embodiment, the primary function of PODS ECU 30 is to estimate occupant weight based on the pressure and temperature signal provided by the sensors 20 and 24, as described for example in the U.S. Pat. No. 5,987,370 to Murphy et al. (which is incorporated by reference herein), and to reliably distinguish between an empty seat and a seat having an object or unrestrained child sitting on it. Essentially, the relationship between occupant weight and the sensed pressure is empirically determined at a variety of temperatures, and the data is used to construct either a mathematical model or a multi-dimensional look-up table of occupant weight as a function of temperature and sensed pressure, with the model or table program med into PODS ECU 30 and used to determine the occupant weight.

According to the present invention, the difficulty in distinguishing between an empty seat and a seat having an object or unrestrained child sitting on it is resolved by initially utilizing a primary classification technique based on measured seat pressure to characterize the seat occupant, and if deployment of the restraint is suppressed due to such characterization, utilizing a secondary classification technique based on variation of the measured pressure to characterize the seat occupant once the vehicle is in motion. Once the secondary classification technique has characterized the seat occupant, the characterization of the primary classification technique is discarded in favor of the characterization of the secondary classification technique.

Figure 2:
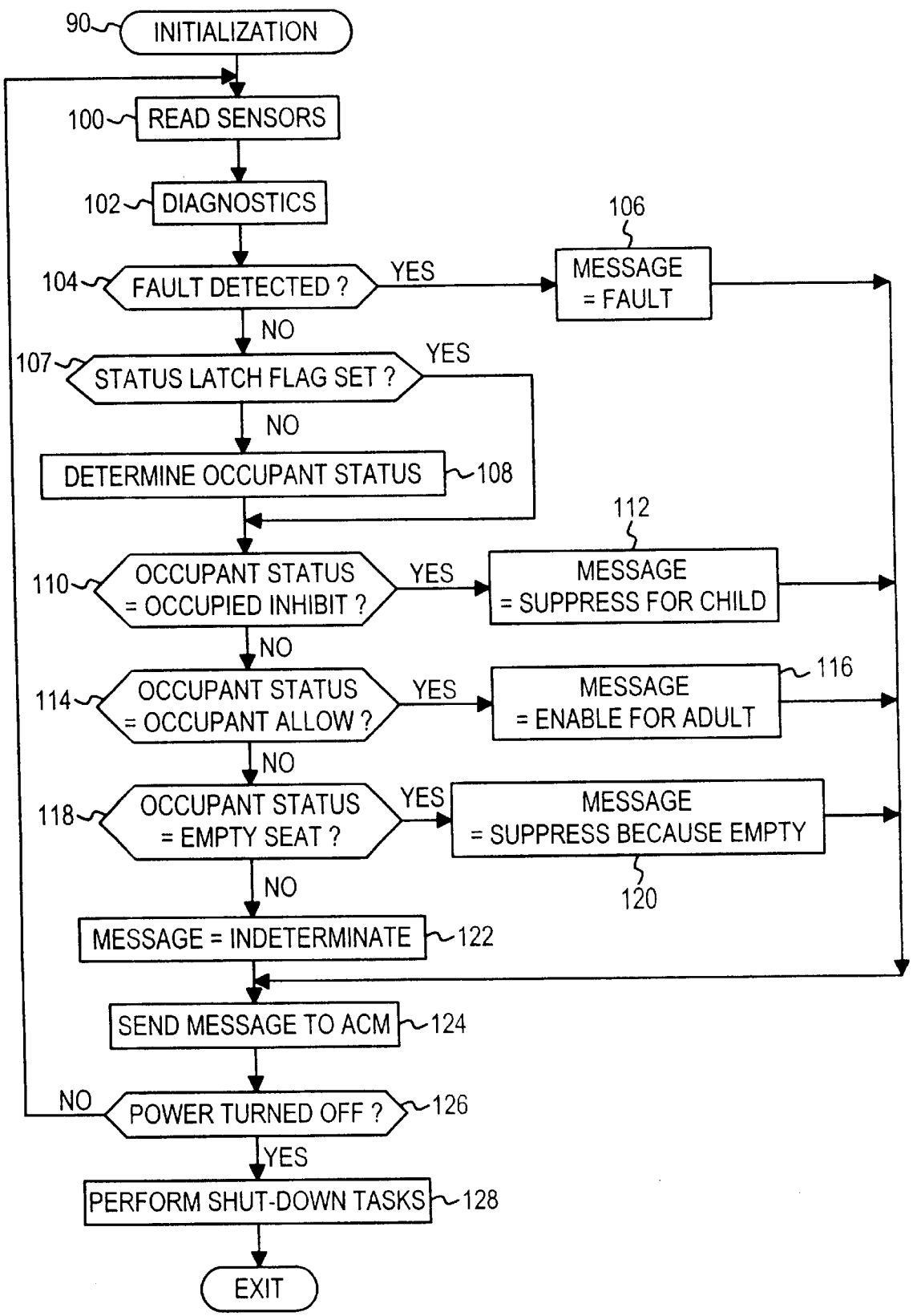
FIGS. 2 and 3 depict a flow diagram representative of a software routine executed by the PODS ECU of FIG. 1 in carrying out the method of this invention.
Figure 3:
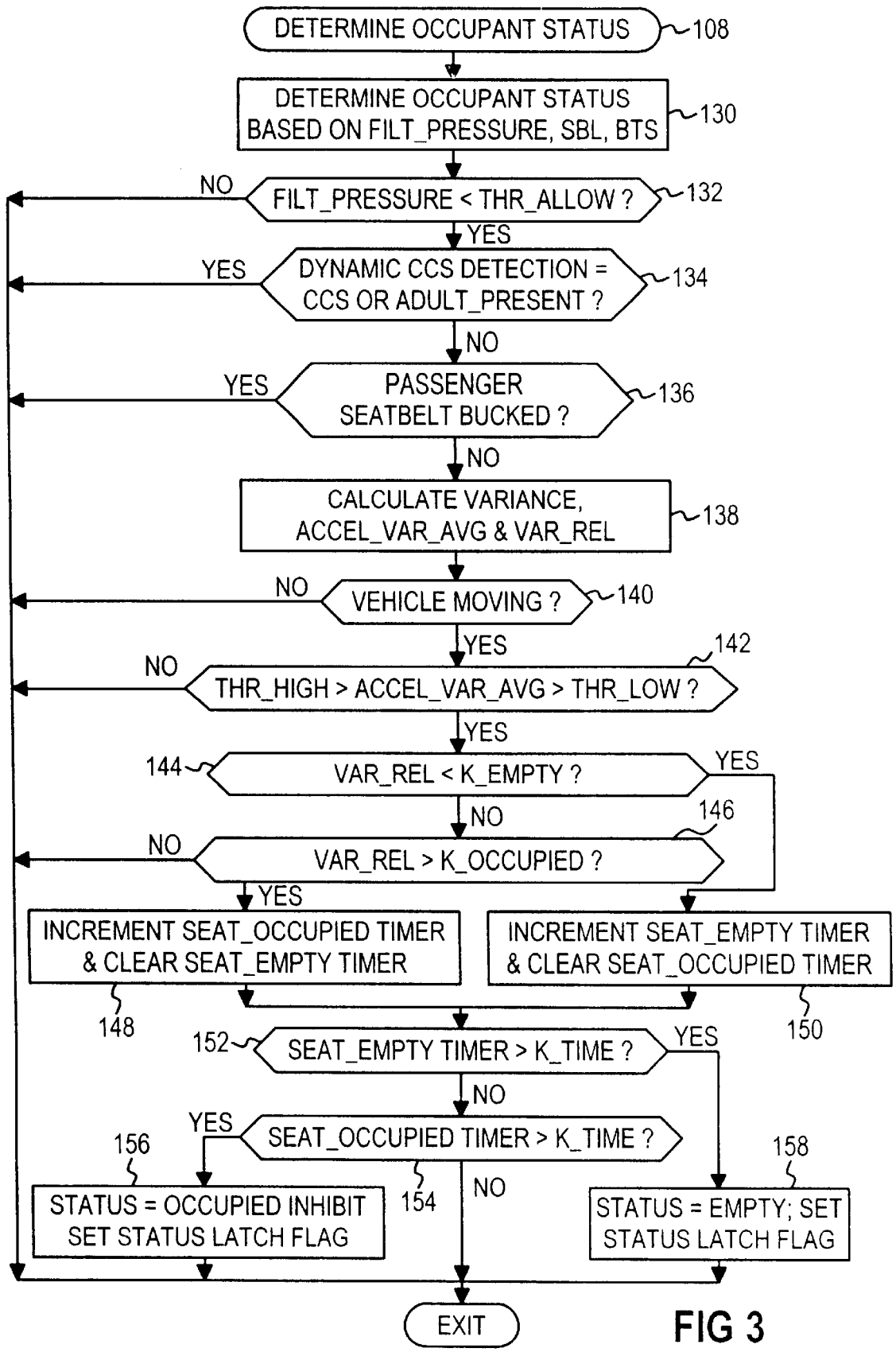

The flow diagrams of FIGS. 2–3 illustrate a software routine periodically executed by the PODS ECU 30 for carrying out this invention. The flow diagram of FIG. 2 represents a main or executive routine, whereas the flow diagram of FIG. 3 details occupant status determination. At the initiation of each period of vehicle operation, the PODS ECU 30 executes an initialization routine as indicated by block 90 of FIG. 2 for initializing various registers, parameters and flags to zero or some other default setting. In the case of this invention, for example, the suppression status (STATUS) may be initialized to a default setting, or to a setting determined in the previous ignition cycle. A similar initialization also occurs in the event of a dynamic reset. Following initialization, the blocks 100–126 are repeatedly executed as shown. The blocks 100 and 102 read all of the sensor information (which may include seat belt latch and seat belt tension information) and perform diagnostic testing of the system and components. If the diagnostic testing detects a fault, the block 104 is answered in the affirmative, and the block 106 sets the status message to FAULT. Otherwise, the block 107 checks if the STATUS LATCH flag has been set. If not, the block 108 is executed to determine occupant status as detailed in the flow diagram of FIG. 3; if so, execution of block 108 is skipped. If the occupant status is OCCUPIED INHIBIT, as determined at block 110, the block 112 sets the status message to SUPPRESS FOR CHILD. If the occupant status is OCCUPANT ALLOW, as determined at block 114, the block 116 sets the status message to ALLOW FOR ADULT. And if the occupant status is EMPTY SEAT, as determined at block 118, the block 120 sets the status message to SUPPRESS BECAUSE EMPTY. If blocks 110, 114, and 118 are answered in the negative, the block 122 sets the status message to INDETERMINATE. The block 124 then sends the determined occupant status message to ACM 32, and the block 126 checks for removal of system power.

When system power is removed, the block 128 is executed to perform shut-down tasks, and the routine is exited.

Referring now to FIG. 3, the block 130 is initially executed to determine occupant status using a primary classification technique based on a filtered version (FILT_PRESSURE) of the detected pressure in bladder 12 and other indicia such as seat belt latch status (SBL) and seat belt tension status (BTS). For example, the occupant status may be set to EMPTY SEAT When FILT_PRESSURE is below a threshold determined in relation to the factory calibrated fluid pressure in bladder 12, to OCCUPIED INHIBIT when FILT_PRESSURE is below a threshold (THR_ALLOW) indicative of a minimum weight adult (such as a $5^{th}$ percentile adult female), and to OCCUPIED ALLOW when FILT_PRESSURE is above THR_ALLOW.

Once block 130 has determined the occupant status using the primary classification technique, the blocks 132–142 are executed to determine if a secondary classification technique based on variation of FILT_PRESSURE should be used to determine occupant status. Essentially, the secondary classification technique is utilized when the occupant status determined by the primary classification technique suppresses deployment of the restraints (as determined at blocks 132 and 134), when the passenger seatbelt is unbuckled (as determined at block 136), and when the vehicle is moving (as determined at block 140). As indicated, the blocks 132 and 134 prevent utilization of the secondary classification technique when FILT_PRESSURE is equal to or higher than the minimum adult weight threshold THR_ALLOW, or when ACM 32 has characterized the occupant as a cinched child seat (CCS) or as an ADULT based on variation of FILT_PRESSURE. If block 132 is answered in the affirmative and blocks 134 and 136 are answered in the negative, the block 138 is executed to update various parameters indicative of the pressure variance. This involves summing filtered values of the pressure sensor output signal PS and the vertical acceleration sensor output signal ACCEL, calculating a sum of squares SQUARE_SUM$_{ps}$, SQUARE_SUM$_{accel}$ for each of the signals, as follows:

$$\text{SQUARE\_SUM}_{ps} = [\text{SQUARE\_SUM}_{ps} + PS_1^2]/\text{REF1}$$

$$\text{SQUARE\_SUM}_{accel} = [\text{SQUARE\_SUM}_{accel} + \text{ACCEL}_1^2]/\text{SAMPLES}$$

where SUM$_{ps}$, is the summation of the pressure signal values, SUM$_{accel}$ is the summation of the acceleration signal values, SAMPLES is the number of summed values, and the subscript f indicates a filtered value. Then, the variance PS_VAR of the pressure sensor signal and the variance ACCEL_VAR of the acceleration sensor signal arc calculated as follows:

$$PS\_\text{VAR} = \text{SQUARE\_SUM}_{ps} - (\text{SUM}_{ps}/\text{SAMPLES})^2$$

$$\text{ACCEL\_VAR} = \text{SQUARE\_SUM}_{accel} - (\text{SUM}_{accel}/\text{SAMPLES})^2$$

The average variance values PS_VAR_AVG and ACCEL_VAR_AVG are then calculated by averaging several successively computed values of PS_VAR and ACCEL_VAR, and tile relative or normalized variance VAR_REL is determined according to the ratio (PS_VAR_AVG/ACCEL_VAR_AVG). The term VAR_REL essentially represents the variance of the pressure sensor signal, normalized to compensate for the influence of the vertical acceleration of the vehicle, due to driving over a rough road surface, for example. The determination of block 140 may be made indirectly when ACCEL_VAR is within a specified range for at least a predetermined period of time, or directly if a vehicle speed input or equivalent is available. And finally, the block 142 prevents utilization of the secondary classification technique if ACCEL_VAR_AVG is outside a range of values defined by the high and low thresholds THR_HIGH and THR_LOW.

The secondary classification technique is defined by blocks 144–158, and involves comparing the relative variance VAR_REL to calibrated values K_EMPTY, K_OCCUPIED indicative of variance values that are characteristic of an empty seat and a seat having an unrestrained object sitting on it. If VAR_REL is less than K_EMPTY, the block 144 is answered in the affirmative, and block 150 is executed to increment an EMPTY_SEAT timer and clear a SEAT_OCCUPIED timer. If VAR_REL is greater than K_OCCUPIED, the block 146 is answered in the affirmative, and the block 148 is executed to increment the SEAT_OCCUPIED timer and clear the EMPTY_SEAT timer. If the EMPTY_SEAT timer reaches a threshold time K_TIME such as 15 minutes, the blocks 152 and 158 are executed to set STATUS to EMPTY SEAT and to set the STATUS_LATCH flag. If the OCCUPIED_SEAT timer reaches K_TIME, the blocks 154 and 156 are executed to set STATUS to OCCUPIED_INHIBIT and to set the STATUS_LATCH flag. Thus, once the secondary classification technique characterizes the occupant status, the result of the primary classification technique is overridden, and the status determined by the secondary classification technique is maintained for the duration of the ignition cycle or until a dynamic reset occurs due to the seat belt becoming unbuckled, or a large shift in FILT_PRESSURE, for example.

In summary, the present invention provides a simple and reliable method of distinguishing between an empty seat and a seat having a small object on it and advising the driver accordingly. While illustrated in reference to the illustrated embodiment, it is expected that various modifications will occur to persons skilled in the art. For example, this invention is not limited to pressure based bladder systems, and may be applied equally as well to other occupant detection systems, as indicated above. Also, horizontal acceleration may be used in order to compensate for detected seat pressure variations due to longitudinal acceleration or deceleration of the vehicle. Accordingly, it should be understood that occupant characterization methods incorporating these and other modifications may fall within the scope of this invention, which is defined by the appended claims.

What is claimed is:

1. A method of operation for an occupant detection system that allows or suppresses deployment of an inflatable restraint in a vehicle based on an output signal responsive to weight applied to a vehicle seat, the method comprising the steps of:

characterizing seat occupancy using a primary classification methodology during a period of vehicle operation prior to movement of said vehicle, where said primary classification methodology determines whether deployment of said inflatable restraint should be allowed or suppressed based on a magnitude of said output signal relative to predetermined thresholds;

characterizing seat occupancy using a secondary classification methodology once the vehicle is in motion if said primary classification methodology determined that deployment of said inflatable restraint should be suppressed, where said secondary classification methodology distinguishes between an empty seat and a seat occupied by an unrestrained object based on variation of said output signal; and displaying seat occupancy based on the characterization of said primary classification methodology until said secondary classification methodology distinguishes between an empty seat and a seat occupied by an unrestrained object, and thereafter displaying seat occupancy based on the characterization of said secondary classification methodology.

2. The method of claim 1, where said vehicle seat has a seat belt for restraining an occupant of said seat, and the method includes the step of:

preventing characterization of seat occupancy using said secondary classification methodology if said seat belt is in use.

3. The method of claim 1, wherein said secondary classification methodology distinguishes an empty seat from a seat occupied by an unrestrained object when the variation of said output signal is below a predetermined variation for at least a predetermined period of time.

4. The method of claim 1, wherein said secondary classification methodology distinguishes a seat occupied by an unrestrained object from an empty seat when the variation of said output signal is above a predetermined variation for at least a predetermined period of time.

* * * * *